(12) United States Patent
Balasubramanian et al.

(10) Patent No.: US 11,561,417 B2
(45) Date of Patent: Jan. 24, 2023

(54) POLARIZED EYEWEAR WITH SELECTIVE BLOCKING

(71) Applicant: ESSILOR INTERNATIONAL, Charenton-le-Pont (FR)

(72) Inventors: Srinivasan Balasubramanian, Charenton-le-Pont (FR); Aref Jallouli, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 70 days.

(21) Appl. No.: 16/954,425

(22) PCT Filed: Dec. 13, 2018

(86) PCT No.: PCT/EP2018/084711
§ 371 (c)(1),
(2) Date: Jun. 16, 2020

(87) PCT Pub. No.: WO2019/121303
PCT Pub. Date: Jun. 27, 2019

(65) Prior Publication Data
US 2021/0080755 A1 Mar. 18, 2021

(30) Foreign Application Priority Data
Dec. 20, 2017 (EP) .................................. 17306851

(51) Int. Cl.
*G02C 7/12* (2006.01)
*G02C 7/10* (2006.01)
(52) U.S. Cl.
CPC .............. *G02C 7/12* (2013.01); *G02C 7/104* (2013.01)

(58) Field of Classification Search
CPC .................................. G02C 7/12; G02C 7/104
USPC ..................................................... 359/159.56
See application file for complete search history.

(56) References Cited

U.S. PATENT DOCUMENTS

| | | | | |
|---|---|---|---|---|
| 2,298,058 A | * | 10/1942 | Land ..................... | G02C 7/12 351/49 |
| 4,247,177 A | * | 1/1981 | Marks ................... | G02C 7/104 351/44 |
| 4,793,669 A | * | 12/1988 | Perilloux .............. | G02B 5/282 359/355 |
| 4,859,039 A | | 8/1989 | Okumura et al. | |
| 4,992,218 A | | 2/1991 | Sugio et al. | |
| 5,051,309 A | | 9/1991 | Kawaki et al. | |
| 5,071,906 A | | 12/1991 | Tanaka et al. | |
| 5,326,507 A | | 7/1994 | Starzewski | |

(Continued)

FOREIGN PATENT DOCUMENTS

| | | |
|---|---|---|
| EP | 0614957 | 9/1994 |
| FR | 2734827 | 12/1996 |

(Continued)

OTHER PUBLICATIONS

International Search Report and Written Opinion Issued in Corresponding PCT Patent Application No. PCT/EP/2018/084711, dated Apr. 11, 2019.

*Primary Examiner* — James R Greece
(74) *Attorney, Agent, or Firm* — Norton Rose Fulbright US LLP (57) ABSTRACT

Provided herein is an improved polarized eyewear with selective light wavelength blocking and a method of making such polarized eyewear.

11 Claims, 6 Drawing Sheets

(56) References Cited

U.S. PATENT DOCUMENTS

| | | | | |
|---|---|---|---|---|
| 5,582,916 | A * | 12/1996 | Ohtsu | B32B 27/30 |
| | | | | 428/412 |
| 6,113,811 | A | 9/2000 | Kausch et al. | |
| 6,373,615 | B1 * | 4/2002 | Mann | C09K 9/02 |
| | | | | 252/582 |
| 2002/0126256 | A1 * | 9/2002 | Larson | G02C 7/12 |
| | | | | 351/159.56 |
| 2003/0076474 | A1 * | 4/2003 | Wang | G02C 7/105 |
| | | | | 351/159.63 |
| 2004/0246437 | A1 * | 12/2004 | Ambler | G02C 7/102 |
| | | | | 351/159.63 |
| 2005/0043793 | A1 * | 2/2005 | Pratt | A61F 9/022 |
| | | | | 623/6.6 |
| 2005/0243272 | A1 * | 11/2005 | Mainster | A61F 2/1659 |
| | | | | 351/159.24 |
| 2005/0254003 | A1 * | 11/2005 | Jani | G03C 1/73 |
| | | | | 351/159.61 |
| 2010/0066971 | A1 | 3/2010 | Kamiya | |
| 2010/0066974 | A1 * | 3/2010 | Croft | G02C 7/105 |
| | | | | 351/159.65 |
| 2010/0283957 | A1 * | 11/2010 | Matera | G02B 5/23 |
| | | | | 351/49 |
| 2014/0078583 | A1 | 3/2014 | DeMeio et al. | |
| 2014/0233105 | A1 * | 8/2014 | Schmeder | G01J 3/465 |
| | | | | 359/590 |
| 2016/0026007 | A1 | 1/2016 | Rinella | |
| 2016/0282639 | A1 * | 9/2016 | von und zu Liechtenstein | |
| | | | | G01J 4/00 |
| 2018/0321510 | A1 * | 11/2018 | Vetro | G02B 5/223 |

FOREIGN PATENT DOCUMENTS

| | | |
|---|---|---|
| WO | WO 1987/004264 | 7/1987 |
| WO | WO 2019/121303 | 6/2019 |

* cited by examiner

POLARIZED EYEWEAR WITH SELECTIVE BLOCKING

CROSS-REFERENCE TO RELATED APPLICATIONS

This application is a national phase application under 35 U.S.C. § 371 of International Application No. PCT/EP2018/084711 filed 13 Dec. 2018, which claims priority to European Patent Application No. 17306851.1 filed 20 Dec. 2017. The entire contents of each of the above-referenced disclosures is specifically incorporated by reference herein without disclaimer.

RELATED FIELD

The present invention relates to improved polarized eyewear having optical filters that selectively block light at specific wavelengths.

BACKGROUND

Blue light, which is part of the visible light spectrum, has a wavelength range of approximately 400 nm to 500 nm. Blue light reaches deeper into the human eye, compared to other wavelengths of light. The human retina does not easily filter such blue light. In humans, the amount of exposure to blue light varies with the time of day, location, and season. During the day, typically 25% to 30% of sunlight is composed of blue light, but there are many other sources of blue light as well. Modern lighting, including LED lights and compact fluorescent lamps (CFLs) can be a strong source of harmful blue light. For example, thirty-five percent (35%) of LED light and 25% of light from CFLs consists of harmful blue light. Other sources of harmful blue light include televisions, laptops, smartphones, tablets, and other such electronic devices. The cumulative effect of blue light exposure over time, particularly high energy visible (HEV) light, which is high-frequency, high-energy light in the violet/blue band from about 400 nm to about 455 nm in the visible spectrum, can potentially cause damage to retinal cells, slowly leading to retinal cell death and potentially to age-related macular degeneration (AMD). The amount and severity of the damage increases exponentially as the wavelength of the radiation decreases towards 400 nm.

Therefore, it is important to protect the human retina from such harmful blue light. Eyewear, such as ophthalmic lenses, can be used to help protect against these harmful effects of blue light. Reducing light transmission in the blue light region of about 400 nm to about 460 nm, as well as the transition regions between blue/green light (i.e., about 460 nm to about 510 nm) and green/red light (i.e., about 560 nm to about 600 nm) provides improved color vision benefits.

Reducing such light transmission can be done by selectively blocking or suppressing specific wavelengths of light from reaching the retina, thereby providing protection from harmful blue light as well as several other benefits, including glare reduction, contrast enhancement, improved color vision, and protection from harmful radiation. These benefits can be realized by using organic dyes in the substrates or coatings of lenses. However, such methods require high concentrations of dye loading and must be applied at the time of lens manufacturing.

Tinted substrates or coatings for lenses used in eyewear have been proposed to provide light filtering by blocking selected wavelengths of light. Tinted polarized lenses can be used to block certain wavelength regions by incorporating dyes that absorb in a particular wavelength region of interest. Selective wavelength filtering can also be achieved by polarization interference using a pair of polarizing elements that are positioned to form a sandwich structure around a retarder film, for example. This arrangement provides color enhancement by blocking cyan wavelength light (around 490 nm) and yellow wavelength light (around 580 nm). Other solutions such as color-changeable light filters using a frame design incorporating a fixed polarizing filter and a rotatable polarizing filter have been proposed. Color adjustment of light using two layers of different colored polarizing filters oriented at 90 degrees to each other has also been proposed. Such proposed filters can also minimize contrast sensitivity, chromatic and spherical aberrations, and color distortions while maximizing visual acuity and blockage of light wavelength transmission of blue light. However, such solutions are static and limiting.

What is needed is a solution that can be dynamically applied to any polarized sunglass on an as-needed basis that will allow for additional flexibility to adjust the light filtering properties of eyewear, depending on the conditions of use. Particularly, there remains a need to provide polarized eyewear that can selectively and dynamically block harmful blue light, in addition to light of other desired wavelength ranges. What is presented herein is improved polarized eyewear having a combination of specific polarized filters that have specific filter orientations that can selectively block harmful blue light as well as other desired wavelength ranges of light, while transmitting other types of wavelengths of light. The optical article described herein comprises at least two polarized filters having specific properties and orientations to provide selective blocking of specific wavelengths of light, while transmitting certain desirable wavelengths of light.

SUMMARY

What is described herein overcomes the problems described above. In one or more embodiments described herein is an optical article that comprises an optical article comprising: at least a first polarizing filter having a first polarization axis and a polarization efficiency of greater than or equal to about 90%; and a second polarizing filter having a second polarization axis and a polarization efficiency of between about 10% and about 99%, wherein the polarization axis of the second polarizing filter is positioned orthogonally relative to the polarization axis of the first polarizing filter such that the optical article selectively blocks at least 95% of light within one or more wavelength ranges, while transmitting light within one or more wavelength ranges.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

As used herein, spatial or directional terms, such as "left," "right," "vertical," "horizontal," "above," "below," and the like, relate to the invention as it is shown in the drawing figures. However, it is to be understood that the invention may assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about" unless indicated to the contrary. Accordingly, unless indicated to the contrary, the numerical values set forth in the following specification and claims may vary depending upon the desired properties sought to be obtained. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As described herein, "coating" is understood to mean any layer, film or varnish that may be in contact with a substrate (defined herein) and/or with another coating deposited thereon, and that may in particular be chosen from tinted, anti-reflection, anti-fouling, impact-resistant, scratch-resistant, polarizing and antistatic coatings.

As described herein, a "dichroic dye" is understood to mean a dye that absorbs light, for a determined wavelength region, of one of the two polarization orthogonal components and which transmits the other polarization orthogonal component. A dichroic dye has the property of polarizing light in a linear manner. When exposed to a light source, for example a polychromatic light source, a dichroic dye transmits at the absorption wavelength a light ray that is linearly polarized, characterized in that its vibration plane depends on the molecular orientation of such dye in the medium where it is contained.

As described herein, the term "lens" is understood to mean an organic or inorganic glass lens, preferably an organic lens, comprising a lens substrate which may be initially coated or partially coated with one or more coatings of various natures.

As described herein, "ophthalmic lens" is understood to mean lenses intended in particular to be fitted into a spectacle frame, having the function of protecting the eyes and/or of correcting sight, these lenses being chosen from afocal, unifocal, bifocal, trifocal and varifocal lenses.

As described herein, "optical article" is understood to mean lenses for instruments and sight lenses, visors, and ophthalmic lenses.

As described herein, the terms "orthogonal" and "perpendicular" are used interchangeably.

As described herein, the term "polarizing filter" is understood to mean one layer or element of a polarizing film. "Polarizing film" is understood to mean a film that can be comprised of at least one polarizing layer or element. A polarizing film can be used in at least a portion of an optical article such as an ophthalmic lens. A "polarizer" is understood to mean an optical filter that lets light waves of a specific polarization pass and blocks light waves of other polarizations.

As described herein, "polarization efficiency" ("PE") is understood to mean a measurement as described in the below equation. For polarized lenses, the polarization efficiency conveys how much polarized light is blocked. Represented another way, $PE=100*(T\|-T\perp)/(T\|+T\perp)$. In this equation, $T\|$ is transmittance of light that is polarized parallel to the transmissive axis of a polarization film, and $T\perp$ is transmittance of light polarized perpendicular to the transmissive axis of the polarization film.

A polarizing film having a polarization axis absorbs light that is polarized perpendicular to its polarization axis and transmits light that is polarized parallel to its polarization axis. If the polarizing film is a reflective polarizer, then light polarized perpendicular to its polarization axis will be reflected, and light polarized parallel will be transmitted. Therefore light that passes through a polarizing film is highly polarized. A polarizing filter is able to polarize light because of the chemical composition of the filter material.

As used herein, the terms "polymer" or "polymeric" are understood to mean oligomers, homopolymers, copolymers, and terpolymers, e.g., polymers formed from two or more types of monomers or polymers.

As described herein, "substrate" is understood to mean the transparent base material of the optical lens and more particularly of the ophthalmic lens. This material serves as a support for a multilayer consisting of one or more coatings, including, in particular, polarizing coatings.

The phrase "usage position of the polarizing ophthalmic lens" is understood to mean the position of this lens when it is fitted into a frame, or in a holder, in front of the eyes of a person conforming to the normal use of the frame or holder, for a vertical position of the person's head.

The phrase "vertical direction" is understood to mean the gravitational vertical direction. In contrast, a horizontal direction makes an angle of 90° relative to the vertical direction.

General Benefits of the Proposed Polarized Product

What is provided herein is an improved polarized lens and method of producing the polarized lens. The primary advantages of the proposed polarizing film comprising a selective light filter described herein are: the selective light filter can be applied dynamically on an as-needed basis instead of on a permanent basis; and the extent of blocking of certain wavelengths of light can be adjusted by varying the angle between the polarization axes of the two polarizing filters.

The present invention pertains to an improved polarized lens and a method of producing such lens that can selectively block certain wavelengths of light. This improved polarized lens can be used for prescription and non-prescription glasses, sunglasses, clip-on lenses, removable patches or films that can be placed on eyewear, such as, but not limited to, eyeglasses, contact lenses and intraocular lenses ("IOLs"), polarizing goggles, and eye shields. The dual filter design of the improved polarized lenses described herein provides protection against macular degeneration by reducing harmful light transmission and ocular photochemical damage that could occur as a result.

Figure 1A:
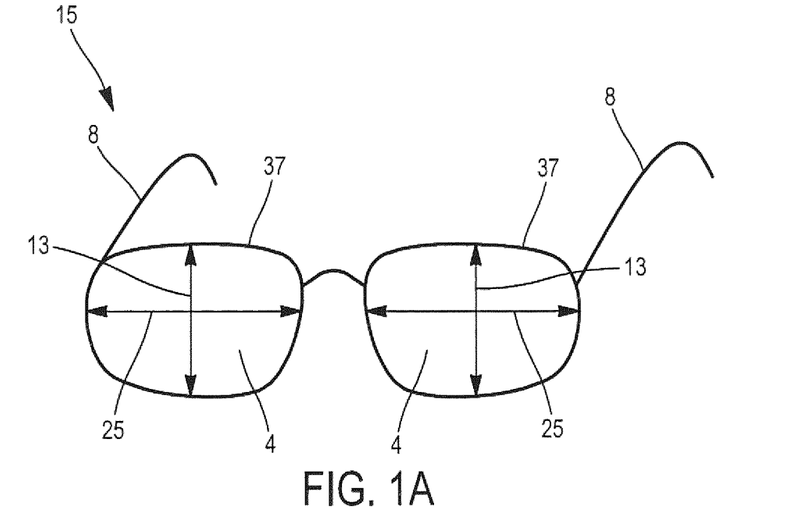
FIG. 1A illustrates a pair of spectacle lenses comprising two polarizing ophthalmic lenses, each lens having at least a first polarizing filter with a polarization axis and at least a second polarizing filter with a polarization axis on the optical surface of each lens.

FIG. 1A represents a spectacle lens 15. The spectacle lens 15 comprises a frame 37 with two arms 8, equipped with two polarizing ophthalmic glasses or lenses 4. The word "glass" is taken in its usual meaning of curved ophthalmic lens for a pair of spectacles, with no relation to the nature of the constituent material of this glass. A spectacle lens such as considered within the context of the invention may therefore be made of a mineral material, for example, based on silicate, or made from an organic material, such as polycarbonate; polyamide; polyimide; polysulfones; polyethylene terephthalate/polycarbonate copolymers; polyolefins, especially polynorbornenes; polymers and copolymers of diethylene glycol bis(allyl carbonate); (meth)acrylic polymers and copolymers especially (meth)acrylic polymers and copolymers derived from bisphenol A; thio(meth)acrylic polymers and copolymers; urethane and thiourethane polymers and copolymers; epoxy polymers and copolymers and episulfide polymers and copolymers. Within the context of the invention, a spectacle lens may be support for polarizing filters, such as those described herein. In this case, the two sides of the lens are parallel, so as not to introduce any image distortion. This may also be a lens having an ophthalmic correction function, regardless of the nature of the correction (correction for myopia, astigmatism, hyperopia, and presbyopia). This may especially be an afocal, single vision, bifocal, trifocal, or progressive lens. The lens may also be associated with other optical functions, such as a solar protection lens or a photochromic lens, etc.

Each polarizing ophthalmic lens 37 comprises at least a first polarizing filter having a first polarization axis or transmission axis 13 that is positioned in the vertical direction relative to the usage position of the polarizing ophthalmic lens and a second polarizing filter having a second polarization axis or transmission axis 25 that is positioned in a horizontal direction relative to the usage position of the polarizing ophthalmic lens and such that the first axis of the first polarizing filter is positioned orthogonally or perpendicularly relative to the second polarizing filter to form "crossed polarizers." The first and second polarizing filters together provide selective wavelength blocking.

Figure 1B:
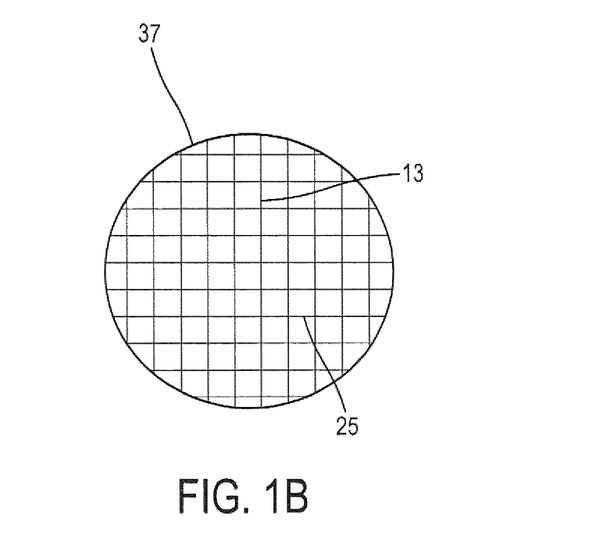
FIG. 1B illustrates a close-up or enhanced view of a portion of the optical surface of the lens of FIG. 1A, showing the polarization axes positioned relative to each other.
Figure 2:
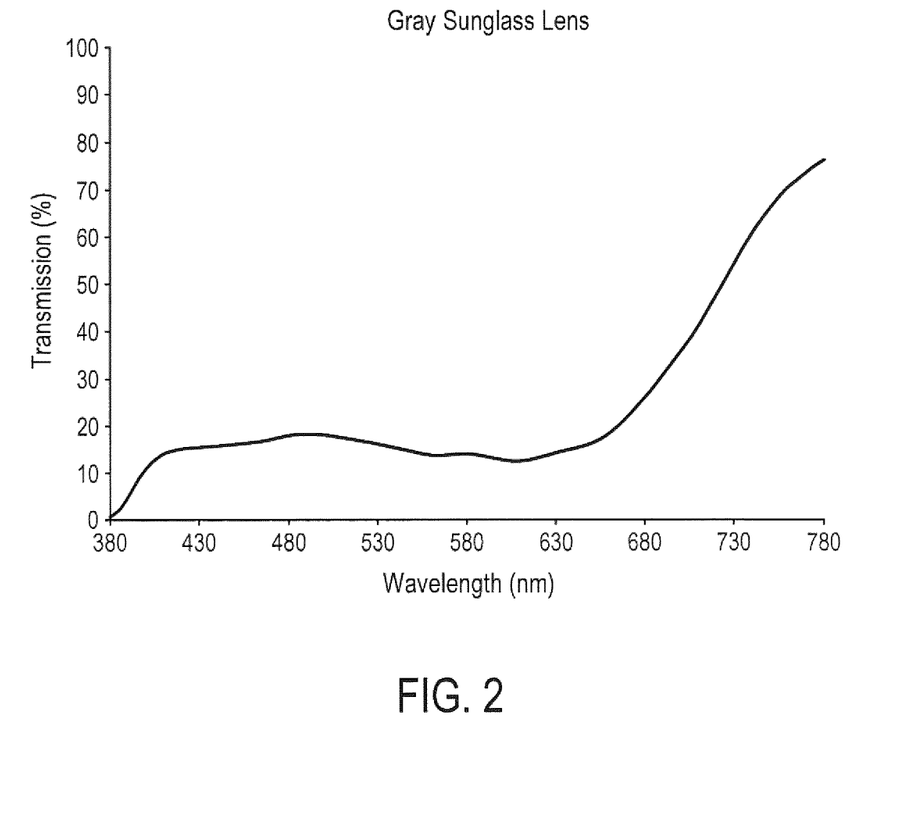
FIG. 2 illustrates a plot of a transmission spectra of a Gray sunglass lens without any dichroic dyes or polarizing filters.

FIG. 1B represents a close-up view of the optical surface of the lens 37 of FIG. 1A. As described in FIG. 1A, in this aspect the lens 37 has a first polarizing filter having a first polarization axis or transmission axis 13 that is positioned in the vertical position relative to the usage position of the polarizing ophthalmic lens and a second polarizing filter having a second polarization axis or transmission axis 25, respectively, that are positioned in a horizontal direction relative to the usage position of the polarizing ophthalmic lens such that the first axis of the first polarizing filter is positioned orthogonally or perpendicularly relative to the second polarizing filter to form "crossed polarizers." Such "crossed polarizers" appear in a grid-like pattern (FIG. 1B). A plurality of lines is depicted in both the vertical and the horizontal directions, representing both the vertical and horizontal polarization axes, respectively. The plurality of vertical and horizontal lines collectively represents a single vertical transmission axis 13 and a single horizontal transmission axis 25 that are positioned orthogonally or perpendicularly relative to each other.

In one aspect, at least one of the polarizing filters can be a neutral color. A neutral color polarizing filter may be a Gray polarizing filter, a Gray-green filter, or a brown filter, each of which has good or high polarization efficiency (i.e., greater than or equal to 90%) across the full visible spectrum, so as not to alter the light transmission profile of any other layers of a lens in which the filter may be present. In one aspect, the Gray or brown polarization filters can be a Brown A, Brown C, Gray A, or Gray C filter. Such polarization filters can have a polarization efficiency of between 90% and 98%, and more particularly between 92% and 98%.

The first and second polarizing filters together produce a polarization film that can be used in an ophthalmic lens, particularly a sunglass lens.

The combination of the above-described first polarization filter and second polarization filter provides filtering for blue light, in particular, and increases contrast in varying types of light conditions. These filters combine to provide protection against age-related macular degeneration ("AMD") by reducing harmful light transmission and ocular photochemical damage. When the two filters are oriented perpendicularly or orthogonally relative to each other, they block light across the visible region. This property of the polarizing filter is used, along with adjusting the spectral features of at least one of the polarizing filters, to absorb light in a specific wavelength region. This provides a substantially complete blocking of light in a wavelength region with minimal impact on other spectral wavelength ranges.

If the polarization film contains a dye that has a specific narrow absorption band, then the resulting transmitted light will be polarized in that narrow band, whereas outside of the absorption window, light is transmitted without being polarized. The polarizing films described herein are formed such that two polarizing films can be overlaid or positioned on top of each other with their polarization axes perpendicular to each other to block light transmission.

The following example describes a polarizing film for use in a high energy blue light blocking lens. The polarizing film can also be used to block light having various wavelength ranges as well. The polarization film may have polarization efficiency of greater than or equal to about 90%. In one embodiment, the polarization efficiency can range from about 95% to about 100%. More particularly, the polarization film may have light transmittance of greater than or equal to about 30%, and in a yet another embodiment, ranging from about 30% to about 95% within the range. The overall polarization efficiency of each of the polarization filters described herein is >99%.

EXAMPLES

Example 1: Yellow Polarizing Film

A polyvinyl alcohol (PVA) base material was used to produce a polarizing film containing Yellow F8G dichroic dye (Kayarus Light Yellow F8G (C.I. Direct Yellow 87, the Color Index Generic Name). The Yellow F8G dichroic dye was added to the polarizing film. Although Yellow F8G dye (Kayarus Light Yellow F8G (C.I. Direct Yellow87)), commercially available from Kayarus Co., Ltd. or Oriental Giant Dyes, was used, other dichroic dyes with similar spectral features can be selected that absorb in a desired wavelength region to provide predetermined filter properties, such as, but not limited to, azo dyes: Kayacelon Yellow C-2RL (C.I. Direct Yellow 164), Sumilight Supra Yellow BC conc, (C.I. Direct Yellow28), Nippon Fast Scarlet GSX (C.I. Direct Red4), Kayarus Supra Brown GTL (C.I. Direct Brown210), Sumilight Supra Orange 2GL 125% (C.I. Direct Orange39), Kayarus Supra Blue BWL 143 (C.I. Direct Blue237), Sumilight Red 4B (C.I. Direct Red81), Direct Fast Orange S (C.I. Direct Orange26), Kayarus Supra Brown GL 125 (C.I. Direct Brown195), Fast Scarlet 4BS (C.I. Direct Red23), and Kayarus Supra Brown B2R (C.I. Direct Brown209).

Structures and materials for the manufacture of light polarizing films with polyvinyl alcohol (PVA) and dichroic dyes can also include those disclosed in U.S. Pat. Nos. 4,859,039, 4,992,218, 5,051,309, 5,071,906, 5,326,507, 5,582,916, and 6,113,811. These patents are incorporated herein in their entirety for their disclosure of materials, processes and structures for producing polarizing elements and layers.

The PVA film used herein (commercially available from Kuraray Co., Ltd.) had a thickness of about 75 microns. This film was fabricated by first washing and soaking the PVA film with water to remove impurities while swelling it with water. More particularly, the PVA film was soaked in water at 25° C. for 5 min while stretching the film. In this swelling and washing step, the PVA film absorbs water, thereby allowing it to be softened to be stretchable at room temperature. In some embodiments, during this step, water-soluble plasticizers can be removed, or optionally, additives can be preliminarily adsorbed. Because the PVA film is not uniformly and sequentially swollen, a variation in the degree of the swelling can occur. A small uniform force can be applied to the film to help ensure uniform elongation and evenness and to avoid forming wrinkles in the film. The PVA film was uni-axially stretched while soaking in water during the stretching step to produce a polarized film having a 1:4 stretch ratio. After stretching, excess water was removed from the PVA film as soon as possible.

The PVA film was then dyed in a dyeing tank using a dye solution, Yellow F8G, at a concentration of between about 0.1% and about 0.5%, mare particularly, about 0.25%, in water at 45° C. for 4 minutes while continuing to stretch the film. The dyeing step occurs by absorption or deposition of dyes to polymer chains of oriented polyvinyl alcohol film. In other embodiments, this step can be carried out before, at the same time as, or after the stretching step. The film was dyed at a temperature of between about 30° C. and about 60° C., and preferably between about 40° C. and about 50° C. After the dyeing step, the film was rinsed with a water rinse bath at 25° C. for 2 min to rinse excess dye.

The dyed film was then soaked in a boric acid solution at a concentration of between about 1% and about 5%, more particularly about 2% in water at 30° C. for 2 min, thereby forming bridges and chelation during the process. The boron soaking step was carried out to improve resistance to heat, water, and organic solvents, to increase thermostability by forming cross bridges among PVA chains, and form chelate compounds with dye molecules to stabilize the film. In other embodiments this step can be carried out before, at the same time as, or after stretching of the PVA film. In this example, the film was stretched before and during boric acid treatment. Although boric acid was used, other metal compounds comprising transition metals may be used. For example, metal salts such as acetates, nitrates and sulfates of fourth-period transition metals such as chromium, manganese, cobalt, nickel, copper and zinc can be used. Metal solutions comprising any of the following may be used: manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate and copper (II) sulfate pentahydrate. Any one of these metals may be used solely, and alternatively, a plurality of types of compounds may be used in combination.

The boron soaking process is typically done at a temperature of between about 20° C. and about 40° C., preferably at temperature of between about 35° C. and about 40° C. The PVA film was immersed in the boric acid from between 1-5 minutes, preferably for about 2 minutes. The film was then rinsed in a water bath at 25° C. for 2 min to rinse off excess boric acid.

Finally the PVA film was dried in the stretched state. In another embodiment the steps of stretching, dyeing, and optionally, soaking, can be sequentially carried out or they can be carried out at the same time. In this example, the steps were sequentially carried out. This step of drying was carried out in a convection oven. As is well known, to prevent excess heating, evaporated moisture from the PVA film was immediately removed to accelerate evaporation. The heat resistance of the PVA film depends on its moisture content. This method allowed the PVA film to be dried, while suppressing a temperature increase. The PVA film was dried at a temperature of about 70° C. or higher, preferably at a temperature of between about 90° C. to about 120° C. for 1 to 120 minutes, preferably for 3 to 40 minutes, and most preferably at a temperature of about 80° C. for 15 minutes, while maintaining the film in a stretched state.

After the film was dried, the resulting Yellow F8G polarizing film was protected by laminating in between two clear protective films. To accomplish this, a transparent protective film or sheet was laminated to the surface of the polarizing film using an adhesive layer. Transparent protective layers that can be used are selected from transparent resins such as triacetyl cellulose (TAC), cellulose acetate butyrate (CAB), polycarbonate, thermoplastic polyurethane, polyvinyl chloride, and polymethyl methacrylate.

Figure 3:
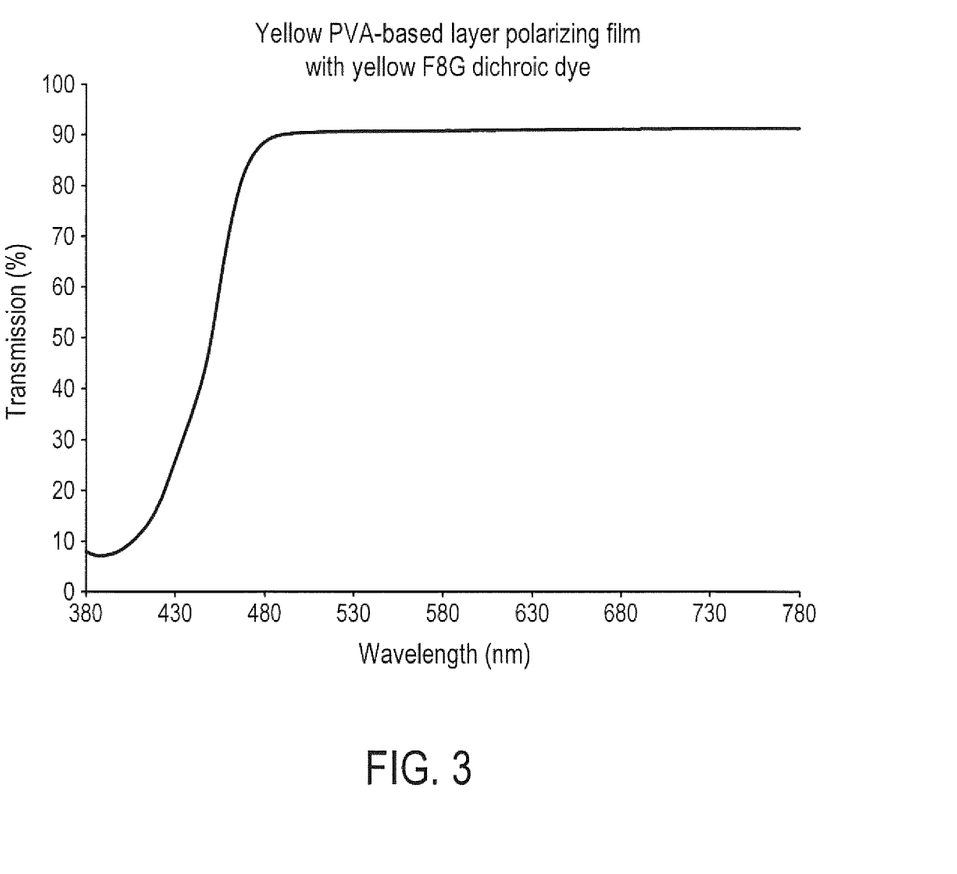
FIG. 3 illustrates a transmission spectra for a light-polarizing yellow polyvinyl alcohol (PVA)-based layer polarizing film containing Yellow F8G dichroic dye. Thus, at least one of the polarizing filters of the polarizing film described herein can comprise at least one dichroic dye.

The transmission spectrum vs. wavelength of the resulting polarizing film is illustrated in FIG. 3. This film absorbs light in the region of approximately 380 nm to 470 nm wavelength of blue light.

Example 2: Comparison of Yellow Polarizing Film to Gray+Yellow Films

In this example, a polarizing film was obtained in a manner similar to that of Example 1, except that in addition to the Yellow F8G dichroic dye, 3 additional polarizing films were produced for comparison to each other, and the combination of dyes was changed for several of the films. Specifically, the following polarizing films that were produced were: 1) a single Gray category 3 polarizing film, 2) a Gray polarizing film+a Yellow F8G polarizing film, orthogonally positioned relative to each other, 3) a Gray polarizing film+a Yellow F8G polarizing film (dye in a coating or substrate, randomly polarized), and 4) a Yellow Y8G+Gray polarizing filter. In this case the Yellow F8G film is not a polarizing film. The dye is not aligned in a specific orientation. They dyes are distributed randomly, and hence, the film is not a polarizing film.

Figure 4:
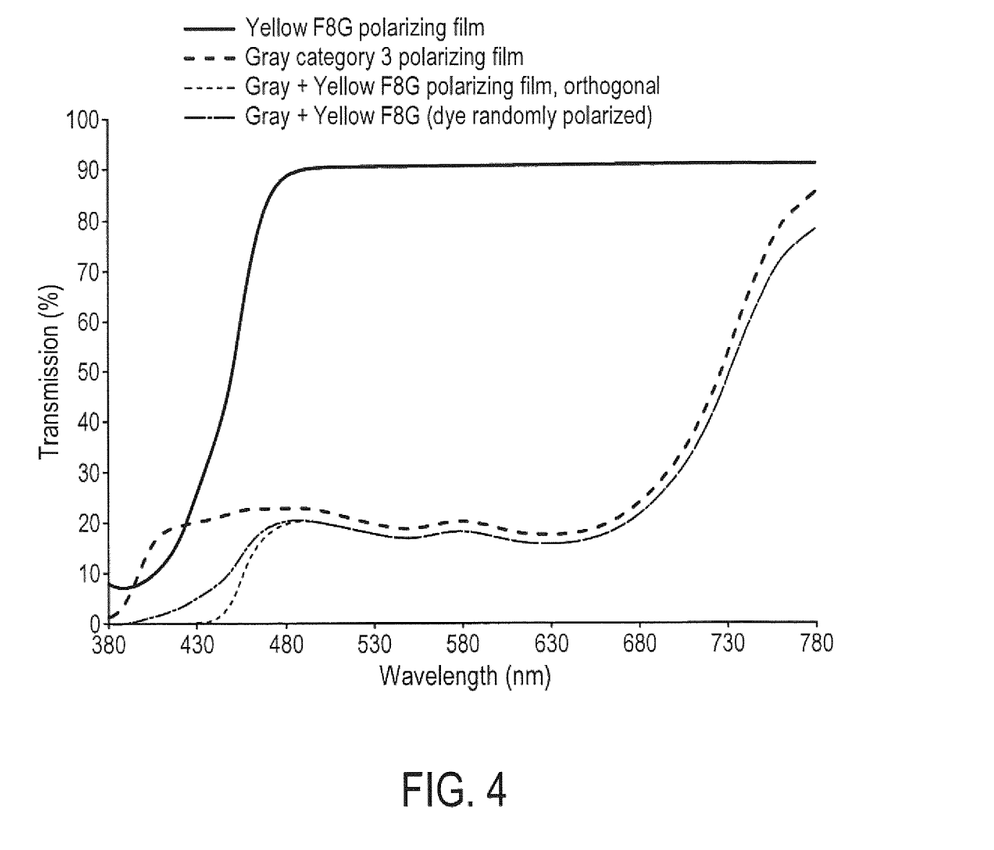
FIG. 4 illustrates a transmission spectra comparing 1) a single Yellow F8G polarizing film; 2) a single Gray category 3 polarizing film; 3) a Gray 3 category polarizing film+ Yellow F8G polarizing film, wherein the polarization axes of each of the Gray film and the Yellow F8G films are perpendicular or orthogonal to relative to each other; and 4) a Gray category 3 polarizing film+a Yellow F8G dichroic dye in a coating or film, wherein the dye is randomly oriented, and the film has no specific axis of orientation.

FIG. 4 illustrates comparative transmission spectra for these different polarizing films: 1) Yellow F8G polarizing film; 2) Gray Category 3 polarizing film; 3) Gray Category 3 polarizing film+Yellow F8G polarizing film, positioned such that the Gray Category 3 polarizing film and the Yellow F8G polarizing film are perpendicular to each other; and 4) Gray Category 3 polarizing film+Yellow F8G (dye in a coating or substrate), where the Yellow F8G film is randomly polarized.

Of the 4 different polarization films described above, the Gray Category 3 polarizing film+Yellow F8G polarizing film, positioned perpendicularly with respect to each other, provides the most effective blocking of blue light from a wavelength of approximately 400 nm to approximately 450 nm. By incorporating the dichroic dye, such as Yellow FBG, directly into the PVA polarizing film instead of incorporating it into a tintable coating of a lens, imbibing it into the substrate of a lens, or mixing it with glue used in a laminate, several problems are avoided. Incorporating the dye outside of the PVA film causes the dichroic dye molecules to have no specific orientation and to be randomly distributed. Because of this, high energy blue light will not be completely blocked. In order to fully block the high energy blue light, an excess amount of the dichroic dye is needed to fully block the harmful blue light. This may lead to other complications such as increased haze and/or non-compatibility with the coating and/or substrate of a lens. Total blue light blockage could also cause some color distortion, which, in turn, could create hazardous situations, i.e., an inability to distinguish traffic lights while driving. Therefore, it's preferred that at least a portion of one or more of the blue light wavelengths between about 400 nm and 500 nm be transmitted. Thus, the film can comprise at least a first polarizing filter having a first polarization axis and a polarization efficiency of greater than or equal to about 90%; and a second polarizing filter having a second polarization axis and a polarization efficiency of between about 10% and about 99%, wherein the polarization axis of the second polarizing filter is positioned orthogonally relative to the polarization axis of the first polarizing filter such that the optical article selectively blocks at least 95% of light within one or more wavelength ranges, while transmitting light within one or more wavelength ranges. The selectively blocked wavelength range can be selected from the group consisting of one or more of the following wavelength ranges: (i) about 400 to about 440 nm; (ii) about 400 nm to about 450 nm; (iii) about 400 nm to about 460 nm; (iv) about 470 nm to about 500 nm; and (v) about 570 nm to about 600 nm. The transmitted wavelength range is selected from at least one of the group consisting of one or more of the following wavelength ranges: (i) about 400 nm to 470 nm; (ii) about 460 nm to about 500 nm; (iii) 500 nm to 570 nm; (iv) 600 nm to 700 nm; and about 500 nm to about 700 nm. The first polarizing filter can have a polarizing efficiency of about 99% or greater. The second polarizing filter has a polarizing efficiency of about 99% or greater in one or more of the following wavelength range of from about 400 nm to about 450 nm, 470 nm to 500 nm, 570 nm to 600 nm. The first polarizing filter can be a first color, and the second polarizing filter can be a second color. The first polarizing filter can be a first color, and the second polarizing filter can be a second color. The first and the second colors can be the same or different. The first color can be, but is not limited to, neutral, Gray, Gray-green, or brown.

Figure 5:
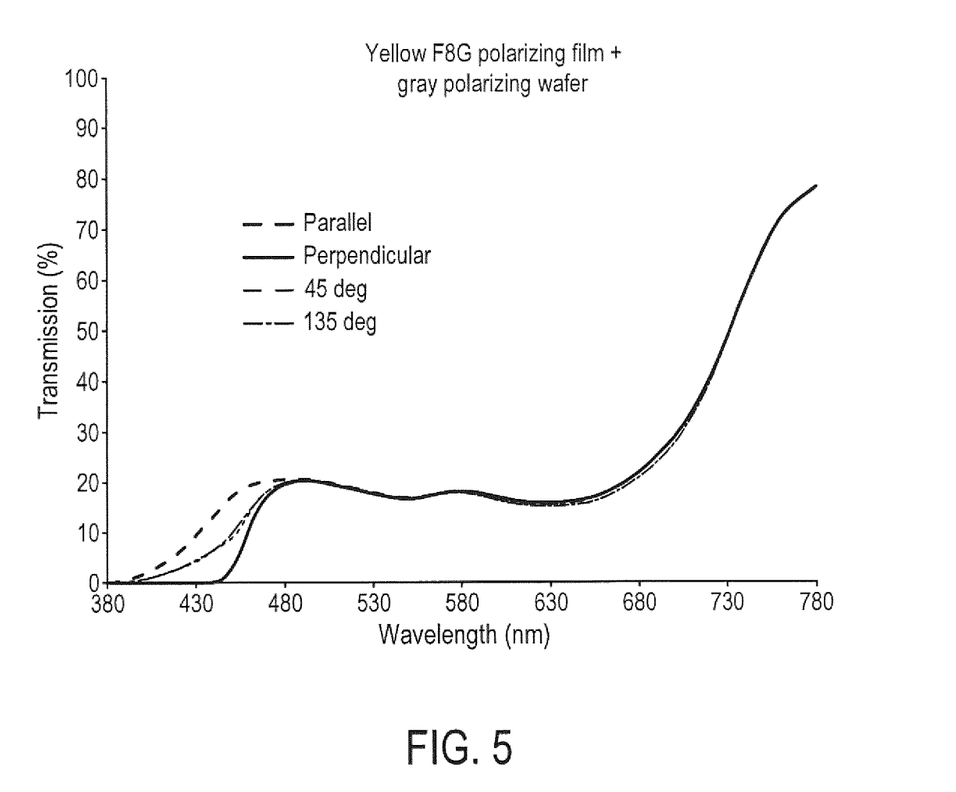
FIG. 5 illustrates a transmission spectra of a polarized filter having a Yellow F8G polarizing film+a Gray polarizing wafer, wherein the polarized axis of each polarized filter is disposed at various predetermined angles, i.e., parallel, perpendicular, a 45 degree angle, and a 135 degree angle, relative to each other, for example.

FIG. 5 illustrates a transmission spectra of a polarized filter having a Yellow F8G polarizing film+a Gray polarizing wafer, wherein the polarized filters are disposed at various predetermined angles relative to each other, i.e., parallel, perpendicular, a 45 degree angle, and a 135 degree angle, for example. Of these 4 different polarization films, the Gray Category 3 polarizing film+Yellow F8G polarizing film, positioned perpendicularly with respect to each other, provides the most effective blocking of blue light from a wavelength of approximately 400 nm to approximately 450 nm.

Table 1

Figure 6:
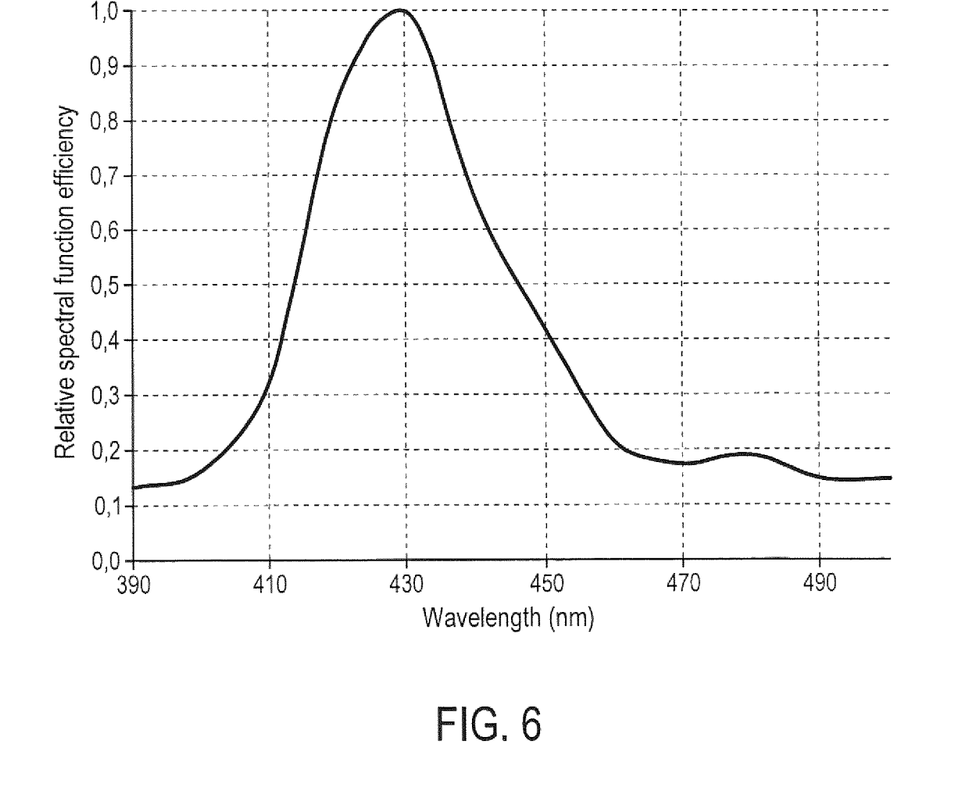
FIG. 6 illustrates the variation of the light dangerousness function $B(\lambda)$ between about 500 and 500 nm.

Below is a Table including several sample filters, along with their corresponding Blue Violet Cut (BVC) factor (mean blue light protection factor) and Retino Cell Apoptosis Reduction value. The BVC factor value is used to indicate the level of protection against high energy blue light. The larger the BVC and RCAR values, the better the protection for a human eye. The mean blue light protection factor BVC between 400 nm and 450 nm, weighted by the function B(λ) represented on FIG. 6, is defined by the following formula:

$$BVC = \frac{\int_{400}^{450} B(\lambda) \cdot T(\lambda) \cdot d\lambda}{\int_{400}^{450} B(\lambda) \cdot d\lambda}$$

The optical articles according to the invention provide a better protection against retinal cell damage, as indicated by the BVC values and RCAR values.

TABLE 1

| Sample | Blue Violet Cut (BVC B) (%) | Blue Violet Cut (BVC B') (%) | Retino Cell Apoptosis Reduction (RCAR) |
|---|---|---|---|
| Airwear Gray | 93.27 | 93.74 | 100.00 |
| Gray Category 3 wafer | 82.33 | 82.56 | 85.63 |
| Gray Cat 3 + YF8G (45 deg) | 94.83 | 95.35 | 100.00 |
| Gray Cat 3 + YF8G (135 deg) | 94.56 | 95.09 | 100.00 |
| Gray Cat 3 + YF8G (Parallel) | 89.61 | 90.48 | 99.48 |
| Gray Cat 3 + YF8G (orthogonal) | 99.52 | 99.71 | 100.00 |

As described above, an optical article comprising the film which comprises a Gray Cat 3 filter+a YF8G filter, wherein each filter is positioned orthogonally relative to each other, has a BVC value of greater than or equal to 90%, more particularly, greater than or equal to 99% and a Retinal Cell Apoptosis Reduction (RCAR) value of 100%.

TABLE 2

| Sample | % Tv (400-440) | % Tv (400-450) | % Tv (400-460) | % Tv (500-700) |
|---|---|---|---|---|
| Airwear Gray | 6.25 | 9.72 | 9.05 | 10.95 |
| Gray Category 3 wafer | 20.00 | 20.57 | 21.19 | 19.58 |
| Gray Cat3 + YF8G (45 deg) | 4.50 | 6.09 | 8.30 | 17.59 |
| Gray Cat3 + YF8G (135 deg) | 4.75 | 6.41 | 8.86 | 17.38 |
| Gray Cat3 + YF8G (Parallel) | 9.39 | 12.14 | 14.48 | 17.95 |
| Gray Cat3 + YF8G (orthogonal) | 0.07 | 0.65 | 3.13 | 17.71 |

As described above, an optical article comprising the film having a Gray Cat 3+YF8G filter wherein each filter is positioned orthogonally relative to each other has a relative light transmission factor in the visible spectrum Tv (400-450) of less than 1%; a relative light transmission factor in the visible spectrum Tv (400-460) of less than 5%; a relative light transmission factor in the visible spectrum Tv (470 nm-500 nm) of less than 10%; and a relative light transmission factor in the visible spectrum Tv (570 nm-600 nm) of less than 10%; a relative light transmission factor in the visible spectrum Tv (470 nm-500 nm and 570 nm-600 nm) of less than 10%.

The yellow polarizing filter described herein can be used with other commercially available polarized sunglass colors as well (e.g., brown, green, Gray-green, etc.) with the similar blocking performance.

The polarizing filters described herein can be used in clip-on lenses, such as those known in the art, which can be removably attached to an ophthalmic lens. The clip-on lens can be removably adhered to a plano lens, such as the pane of a pair of spectacles or sunglasses.

Likewise, the polarizing filters described herein can be used in one or more reversibly adherent removable optical patches, such as those known in the art, that can temporarily convert ophthalmic lenses to blue-blocking lenses. Such patches can be conformed to the surface of an ophthalmic lens. When used in these forms, the polarizing films described herein can be used to provide selective wavelength blocking of high energy blue light "on demand" for commercial polarized sunglasses, color tuning, or color contrast enhancement and sensitivity of commercially available polarized sunglasses. In other embodiments, the invention described herein can be used in films for mass manufacturing of ophthalmic lenses.

In other embodiments such polarizing filters can be produced to provide higher transmission in the wavelength ranges of about 460 nm to about 510 nm, compared to other visible wavelengths for day time outdoor use, etc.

In other embodiments the polarizing filters described herein can be manufactured in mass production and cast processes, as well as by fabricating a double layer polarizing film laminate and subsequently injection molding or casting lens substrates. Particularly recommended substrates are those substrates obtained by (co)polymerizing bis allyl carbonate of diethylene glycol, marketed, for example, under the trade name CR-39® by PPG Industries (ESSILOR ORMA® lenses). The particularly recommended substrates also include those substrates obtained by polymerizing thio (meth)acrylic monomers, such as those described in the French patent application FR 2734827. The substrates may be obtained by polymerizing mixtures of the hereinabove mentioned monomers, or they also may comprise mixtures of such polymers and (co)polymers. Exemplary substrates are those made of a crosslinked material (thermosetting material); especially allylic, (meth)acrylate type, thio(meth) acrylate type or poly(thio)urethane substrates.

In one exemplary embodiment an Orma® lens substrate (obtained by polymerizing CR-39° diethylene glycol bis ((allyl carbonate) monomer) can be used. The ORMA lens can be coated with an abrasion-resistant and/or an anti-scratch coating ("Mithril" hard coat), such as that disclosed in example 3 of EP 0614957. The substrate onto which the coating described herein is deposited may be any substrate capable of receiving the materials described herein. In some embodiments, the substrate may be transparent. In some embodiments, the substrate may be an optical article. The substrate may be a lens, such as an ophthalmic lens or lens blank.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention. The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise. The invention illustratively disclosed herein suitably may be practiced in the absence of any element or step that is not specifically disclosed or claimed. Furthermore, no limitations are intended to the details of construction, composition, design, or steps herein shown, other than as described in the claims.

The invention claimed is:

1. An optical article comprising:
   at least a first polarizing filter comprising at least one dichroic dye, having a first polarization axis and a polarization efficiency of greater than or equal to about 90%; and
   a second polarizing filter comprising at least another dichroic dye, having a second polarization axis and a polarization efficiency of between about 10% and about 99%, wherein the polarization axis of the second polarizing filter is positioned orthogonally relative to the polarization axis of the first polarizing filter such that the optical article has a transmission factor between 400 nm and 450 nm of less than 1% and above 10% from 500 nm to 700 nm.

2. The optical article of claim 1, wherein the first polarizing filter has a polarizing efficiency of about 99% or greater.

3. The optical article of claim 1, wherein the second polarizing filter has a polarizing efficiency of about 99% or greater in one or more of the following wavelength range of from about 400 nm to about 450 nm, 470 nm to 500 nm, 570 nm to 600 nm.

4. The optical article of claim 1, wherein the first polarizing filter is a first color, and the second polarizing filter is a second color.

5. The optical article of claim 4, wherein the first color is selected from the group consisting of: neutral, Gray, Gray-green, or brown.

6. The optical article of claim 1, wherein the optical article has a Blue Violet Cut (BVC) value of greater than or equal to 99%.

7. The optical article of claim 1, wherein the optical article has a Retinal Cell Apoptosis Reduction (RCAR) value of 100%.

8. The optical article of claim 1, wherein the optical article comprises a relative light transmission factor in the visible spectrum Tv (400 nm-460 nm) of less than 5%.

9. The optical article of claim 1, wherein the optical article comprises a relative light transmission factor in the visible spectrum Tv (470 nm-500 nm) of less than 10%.

10. The optical article of claim 1, wherein the optical article comprises a relative light transmission factor in the visible spectrum Tv (470 nm-500 nm and 570 nm-600 nm) of less than 10%.

11. The optical article of claim 1, wherein the optical article is an ophthalmic lens.

* * * * *